United States Patent Office 3,253,950
Patented May 31, 1966

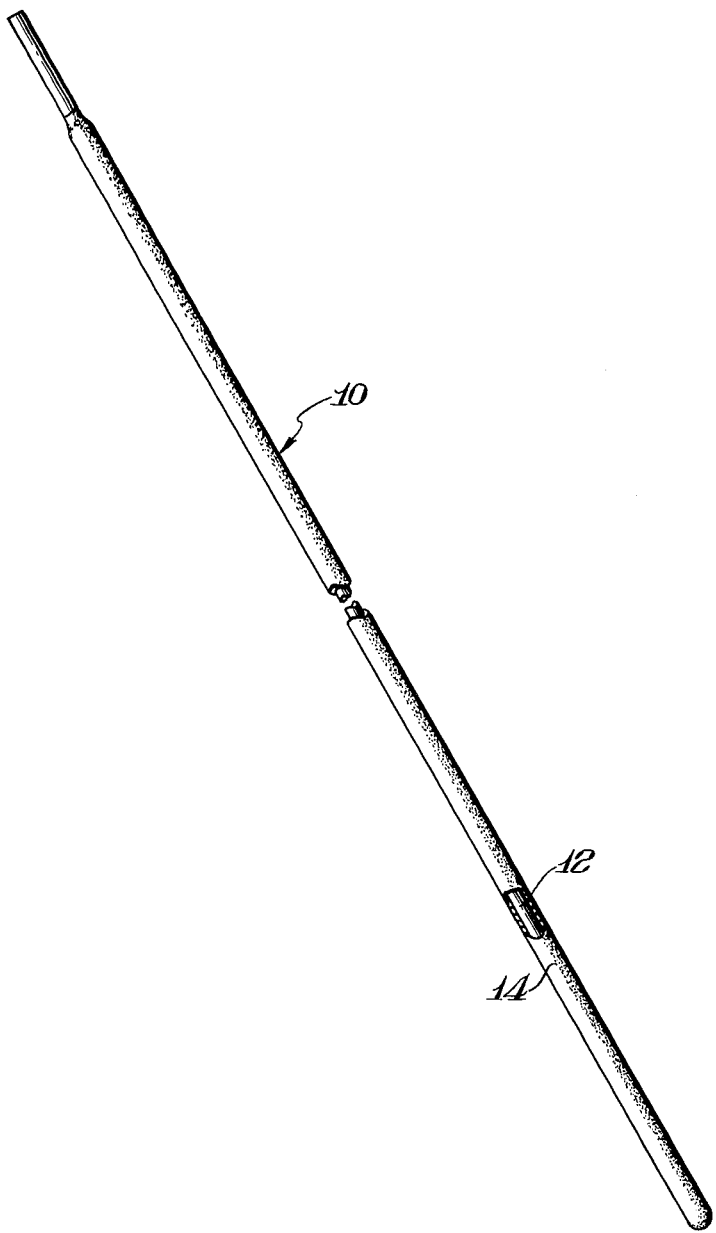

3,253,950
FLUX-COATED WELDING ELECTRODE
Rene D. Wasserman, Stamford, Conn., and Joseph F. Quaas, Island Park, N.Y., assignors to Eutectic Welding Alloys Corporation, Flushing, N.Y., a corporation of New York
Filed May 1, 1962, Ser. No. 191,562
4 Claims. (Cl. 117—206)

This invention relates to a flux-coated electrode for application to cast iron, and it more particularly relates to such an electrode for joining, filling-in and surfacing cast iron parent materials.

Heretofore cast iron repairs and joints have been mainly accomplished by depositing brasses or bronzes by torch techniques. Mild steel or cast iron cores with dipped or extruded flux coatings have been so used, but they have required the application of high preheat to the parent material. Despite this high preheat, the so deposited weld metal was hard and lacked ductility. Metallurgical observations of the deposited weld metal with this type of rod usually have revealed a white cast iron structure predominately formed by iron carbide otherwise referred to as cementite. In addition, deposited copper alloys require painting to conceal the fact that they do not match the cast iron parent metal.

An object of this invention is to provide a flux-coated electrode which is capable of forming ductile deposits on cast iron parent materials with a minimum of preheat.

Another object is to provide such an electrode whose deposits match cast iron parent materials in color.

In accordance with this invention a flux-coated electrode incorporates a cast iron core covered by a flux coating of the following constituents in the indicated ranges or percentages by weight.

| Constituent | Range | Example |
| --- | --- | --- |
| Active metal fluorides (calcium, potassium, sodium) | 5-35 | 11 |
| Alkaline earth carbonates (calcium, barium, strontium) | 25-60 | 38 |
| Carbon (graphite, charcoal coke, coal, etc.) | 5-35 | 20 |
| Silicon (or silicon or ferrosilicon powder) | 2-20 | 6 |
| Metallics (metal powders) | 5-60 | 22.5 |
| Inoculant (magnesium, cerium or yttrium powder) | 0.3-7 | 2.5 |

Such an electrode requires only a minimum of preheat, and metallurgical observation of its deposited weld metal indicates that the structure is similar to that of gray cast iron. The deposited weld metal is quite machinable and provides good color match with the parent cast iron material. Deposition of this electrode is quite easy due to the fact that the operator has excellent control. It operates on D.C. straight and reverse as well as A.C. power supplies.

With this electrode the fusion zone is very thin and is held to an obsolute minimum, thus minimizing the effect of the deposited weld metal on the parent material and preserving its machinability. The machinability of the deposit and the weld zone adjacent to the deposit is also good. The deposited weld metal from this rod has the same properties as the parent material after welding and for years thereafter. The flow of the deposited metal is excellent. Finishing costs are minimized because the deposit is not convex and grinding, for example, is not necessary.

The highly alloyed materials used previously are prone to crack. This electrode provides a weld metal having great crack resistivity. In fact it has better crack resistivity than these highly alloyed materials. The deposited weld metal has heat resistance and coefficients of expansion and contraction similar to those of the cast iron parent material.

These coating materials are bonded by conventional water-soluble silicates representing approximately 5 to 10% of the overall coating formulation on a dry basis.

The deposit is homogeneous, with excellent density with no porosity or holes.

This formulation imparts a fine spray-type transfer of the weld metal. This type of transfer is conducive to minimum heat input with respect to the parent material resulting in less dilution with the parent material and a minimum heat-affected zone.

The metallics consist of metal powders such as aluminum, nickel and magnesium, of between 40 to 325 mesh.

The carbonaceous matter contained within the formulation reacts with the iron and magnesium bearing materials to form a deposited weld metal similar to gray cast iron with respect to structure. The carbon in this formulation therefore does not combine with the iron to form hard, brittle iron carbide. The metallics act as deoxidizers and contribute to the alloy content of the deposited weld metal. The inoculants are conducive to forming carbon in the form of flake and globular graphite. The mesh size of the silicon and inoculant powders are the same as that of the metallic powders.

The carbonates provide a source of carbon monoxide and carbon dioxide to protect the weldment during deposition, and they also contribute to whatever resultant slag cover is obtained.

The fluorides are cleansing materials and they go over to form part of the slag blanket. Because the slag blanket is so small in respect to thickness and volume, and is also conductive, the weld metal can be deposited pass over pass without the usual slag removal operation.

The silicon powder contributes to the silicon content of the deposited weld metal and acts as a deoxidizer.

Novel features and advantages of the present invention will become apparent to one skilled in the art from a reading of the following description in conjunction with the accompanying drawings and in which reference characters refer to similar parts and in which the single figure is a perspective view of one embodiment of this invention.

In the drawing is shown a welding electrode 10 incorporating a core or rod 12 and a flux coating 14. Rod 12 is for example an ⅛ inch diameter cast iron rod and the flux coating is formulated from the following compositions in percentage by weight.

Constituent:                                        Example
    Calcium fluoride _____ 11
    Calcium carbonate _____ 38
    Graphite _____ 20
    Ferro-silicon powder _____  6
    An approximately equal mixture of aluminum
      and nickel powders _____ 22.5
    An inoculant powder consisting of magnesium _____ 2.5
                                                   _____
                                                   100.0

The powders in the above formulation range from 40 to 325 mesh size, and the flux composition is mixed with a suitable binder of conventional water-soluble silicates which represent approximately 5 to 10% of the overall coating formulation on a dry basis. A coating which is approximately 1/32 inch in radial dimension is coated upon a ⅛ inch core wire of a ferrous metal such as cast iron, to provide an overall diameter of approximately 3/16 of one inch for the resultant electrode.

What is claimed is:
1. A flux-coated welding electrode consisting essential- ly of a cast iron rod upon which is coated the following flux formulation in the indicated ranges of percentages by weight

| Constituent: | Range |
|---|---|
| Active metal fluorides | 5–35 |
| Alkaline earth carbonates | 25–60 |
| Carbon | 5–35 |
| Silicon | 2–20 |
| Metallic powders of magnesium, aluminum, nickel or mixtures thereof | 5–60 |
| Inoculant selected from the group consisting of magnesium, cerium and yttrium powders | 0.3–7 |

2. An electrode as set forth in claim 1 wherein said core metal is gray cast iron.

3. An electrode as set forth in claim 1 wherein said fluorides and carbonates are those of calcium.

4. An electrode as set forth in claim 3 wherein said inoculant is magnesium powder.

References Cited by the Examiner
UNITED STATES PATENTS

| 2,213,390 | 9/1940 | Franklin | 117—206 |
| 2,855,333 | 10/1958 | Wasserman et al. | 117—206 |
| 2,900,490 | 8/1959 | Petryck et al. | 117—206 |

WILLIAM D. MARTIN, *Primary Examiner.*

RICHARD D. NEVIUS, *Examiner.*

H. W. MYLIUS, *Assistant Examiner.*